United States Patent
Chakraborty et al.

(10) Patent No.: US 10,000,623 B2
(45) Date of Patent: Jun. 19, 2018

(54) ACCELERATOR COMPOSITIONS AND METHODS

(71) Applicant: ROBINSON BROTHERS LIMITED, West Bromwich (GB)

(72) Inventors: Khirud Behari Chakraborty, West Bromwich (GB); Maxson Liu, West Bromwich (GB)

(73) Assignee: ROBINSON BROTHERS LIMITED, West Bromwich (GB)

( * ) Notice: Subject to any disclaimer, the term of this patent is extended or adjusted under 35 U.S.C. 154(b) by 84 days.

(21) Appl. No.: 15/035,558

(22) PCT Filed: Nov. 4, 2014

(86) PCT No.: PCT/GB2014/053271
§ 371 (c)(1),
(2) Date: May 10, 2016

(87) PCT Pub. No.: WO2015/071641
PCT Pub. Date: May 21, 2015

(65) Prior Publication Data
US 2016/0264760 A1    Sep. 15, 2016

(30) Foreign Application Priority Data

Nov. 12, 2013 (GB) .................................. 1319917.9
Sep. 5, 2014 (GB) .................................. 1415759.8

(51) Int. Cl.
| | |
|---|---|
| *C10C 3/02* | (2006.01) |
| *C08K 5/39* | (2006.01) |
| *C08K 5/00* | (2006.01) |
| *C08K 3/04* | (2006.01) |
| *C08K 5/11* | (2006.01) |
| *C08K 5/17* | (2006.01) |
| *C08K 5/18* | (2006.01) |

(52) U.S. Cl.
CPC .................. *C08K 5/39* (2013.01); *C08K 3/04* (2013.01); *C08K 5/0025* (2013.01); *C08K 5/11* (2013.01); *C08K 5/17* (2013.01); *C08K 5/18* (2013.01)

(58) Field of Classification Search
CPC ... C08K 5/39; C08K 5/17; C08K 3/04; C08K 5/18; C08K 5/11
See application file for complete search history.

(56) References Cited

U.S. PATENT DOCUMENTS

| | | | |
|---|---|---|---|
| 3,681,303 A | 8/1972 | Amico | |
| 6,699,936 B1 | 3/2004 | Nishimura et al. | |
| 2002/0132913 A1* | 9/2002 | Weydert | C08L 21/00 524/588 |
| 2005/0080179 A1* | 4/2005 | Kim | C08J 3/205 524/445 |
| 2011/0160344 A1 | 6/2011 | Shoji et al. | |
| 2012/0302665 A1* | 11/2012 | Wang | B60C 1/0016 523/157 |
| 2013/0236670 A1 | 9/2013 | Hamaguchi et al. | |

FOREIGN PATENT DOCUMENTS

| | | |
|---|---|---|
| BG | 51870 A1 | 10/1993 |
| CN | 103131058 A | 6/2013 |
| CN | 103483649 A | 1/2014 |
| FR | 1463733 A | 6/1966 |
| FR | 1505426 A | 12/1967 |
| JP | 04180944 A | 6/1992 |
| JP | 2003155409 A | 5/2005 |
| JP | 2006176763 A | 7/2006 |
| WO | 97/14748 A1 | 4/1997 |
| WO | 2013051689 A1 | 4/2013 |

OTHER PUBLICATIONS

Machine Translation of JP 2013-108019.*
XP002735712—Database WPI, Week 201340, Thomson Scientific, London, GB; JP 2013108019A (Bridgestone Corp) (Jun. 6, 2013), abstract.
Hofler, Thomas, "International Search Report and Written Opinion of the International Searching Authority" for International Application No. PCT/GB2014/053271, European Patent Office, dated Feb. 22, 2015.

* cited by examiner

*Primary Examiner* — Hannah J Pak
(74) *Attorney, Agent, or Firm* — Florek & Endres PLLC (57) ABSTRACT

The invention provides a composition comprising a mixture or reaction mixture of a carbodithioic acid of formula: (I) or its internal salt; and at least one compound independently selected from a natural or synthetic rubber curing or vulcanization accelerator, activator or retarding agent. wherein R' and R" are independently selected from a C2-C18 aliphatic moiety; aromatic moiety; alicyclic moiety; aromatic heterocyclic moiety; and aliphatic heterocyclic moiety or R' and R" may together form part of an aromatic heterocyclic ring moiety or aliphatic heterocyclic ring moiety.

22 Claims, 5 Drawing Sheets

| Accelerator | 100% Mod (MPa) | Ultimate Tensile Strength (MPa) | Elongation at break (%) | 15 min MDR test at 160°C | | | |
|---|---|---|---|---|---|---|---|
| | | | | Minimum torque MH (lbin) | Scorch time TS1 (min) | Cure time T90 (min) | Cure rate (lbin/min) |
| Piperazine-1-carbothioic acid | 0.74 | 9.1 | 703 | 13.12 | 01:36 | 00:11:42 | 1.6 |
| Accelerator composition of example 1 | 0.8 | 10.8 | 661 | 12.43 | 00:50 | 00:07:59 | 2.93 |

Table 2: results of parameter tests on the cured polychloroprene rubber of Example 3;

| System | mol equiv diamine | Tensile Results (unaged) | | | Tensile Results (7days @ 70) | | | Rheology results (160°C for 15') | | | | Hardness | |
|---|---|---|---|---|---|---|---|---|---|---|---|---|---|
| | | 100% Mod (MPa) | ultimate tensile strength UTS (MPa) | elongation at break E@B (%) | 100% Mod (MPa) | UTS (MPa) | E@B (%) | Minimum torque MH | Scorch time (mins) TS1 | Cure time (mins) T90 | Cure rate lbin/min | Unaged | 7days @ 70C |
| MgO (4phr), ZnO (1phr), accelerator composition of example 1 (2phr) 1,4DAB.SA MFA (0.5phr) TBzTD (0.5phr) | 0.25 | 12.88 | 19.2 | 150 | 13.76 | 18.2 | 134 | 44.65 | 00:32 | 11:03 | 7.42 | 83 | 84 |
| MgO (4phr), ZnO (1phr), accelerator composition of example 1 (2phr) 1,4 DAB.SA MFA (0.5phr) TBzTD (0.5phr) | 0.5 | 13.43 | 15.7 | 118 | 15.56 | 17.8 | 115 | 48.24 | 00:26 | 10:47 | 8.94 | 84 | 84 |
| MgO (4phr), ZnO (1phr), accelerator composition of example 1 (2phr) 1,4DAB.SA MFA (0.5phr) TBzTD (0.5phr) | 1 | 13.45 | 18.4 | 138 | 16.02 | 18.8 | 118 | 45.51 | 00:22 | 09:42 | 10 | 85 | 85 |
| ETU (1phr), MgO (4phr), ZnO (5phr) | | 12.55 | 16.25 | 131 | 16.04 | 18 | 113 | 55.77 | 00:34 | 09:27 | 11.22 | 85 | 84 |

Table 3: results of parameter tests on the cured polychloroprene rubber of Example 4;

Fig.3

| Formulation (ingredient phr) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| NR SMR CV60 (natural rubber) | 100 | | | | | | | | | | | | | | |
| IR Natysn 2200 (polyisoprene) | | 100 | | | | 100 | | | | | | | | | |
| NBR Perbunan 3445 (nitrile butadiene rubber) | | | 100 | | | | 100 | | | | 100 | | | | |
| EPDM Nordel IP 4520 (ethylenepropylenediene rubber) | | | | 100 | | | | 100 | 100 | | | | | | |
| SBR/NR blend [65%/35%] (styrene-butadiene/natural rubber) | | | | | 100 | | | | | 100 | | 100 | 100 | 100 | 100 |
| Zinc Oxide | 3 | 3 | 3 | 3 | 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 | 1 | 1 | 1 | 1 | 1 |
| Sulphur | 2 | 2 | 2 | 2 | 2 | 2 | 2 | 2 | 2 | 2 | 2 | 2 | 2 | 2 | 2 |
| Accelerator Composition of Example 1 | 1.5 | 1.5 | 1.5 | 1.5 | 1.5 | 0.75 | 0.75 | 0.75 | 0.75 | 0.75 | 0.75 | 0.75 | 0.75 | 0.75 | 0.75 |
| Zinc 2-ethylhexyl and isobutyl dithiophosphate | | | | | | 0.75 | 0.75 | 0.75 | 0.75 | 0.75 | | | | | |
| N-tert-butyl-2-benzothiazole sulphenamide | | | | | | | | | | | 0.75 | 0.75 | 0.75 | 0.75 | 0.75 |

Table 4: Formulations from Example 5

Fig.4

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Minimum torque (MH), lb.in | 1.38 | 2.2 | 1.28 | 1.29 | 1.5 | 1.46 | 2.09 | 1.29 | 0.85 | 1.29 | 0.99 | 2.17 | 1.1 | 1.37 | 1.21 |
| Maximum torque (ML), lb.in | 10.8 | 11.43 | 21.27 | 16.3 | 10.38 | 11.08 | 11.65 | 19.88 | 19.79 | 10.43 | 13.66 | 14.44 | 21.2 | 23.12 | 12.68 |
| Delta Torque (MH-ML), lb.in | 9.42 | 9.23 | 19.99 | 15.01 | 8.88 | 9.62 | 9.56 | 18.59 | 18.94 | 9.14 | 12.67 | 12.27 | 20.1 | 21.75 | 11.47 |
| Scorch time (ts1), min | 0.76 | 0.57 | 0.75 | 0.92 | 0.99 | 0.86 | 0.67 | 0.7 | 1.5 | 1.22 | 1.4 | 0.6 | 0.73 | 0.94 | 2.19 |
| Cure time (t90), min | 6.16 | 3.99 | 14.74 | 20.14 | 9.47 | 3.35 | 2.76 | 11.07 | 15.22 | 6.42 | 3.04 | 1.99 | 5.1 | 10.8 | 4.79 |
| Cure rate (Rh), lb.in/min | 3.3 | 5.52 | 4.78 | 2.22 | 2.09 | 7.29 | 8.25 | 4.4 | 2.18 | 2.8 | 12.32 | 9.69 | 12.3 | 3.84 | 8.02 |

Table 5: Rheology testing of Formulations 1-15 of Table 4

Fig. 5

| Type of accelerator or activator | | 401<br>Mono-amine Activator | 402<br>Amine Salt Activator | Formulation<br>403<br>Sulfur-containing accelerator | 404<br>Non-Sulfur-containing accelerator | 405<br>Retardant |
|---|---|---|---|---|---|---|
| Minimum torque (MH), lb.in | 15 min MDR test at 160°C | 8.62 | 8.34 | 6.41 | 9.43 | 2.79 |
| Maximum torque (ML), lb.in | | 1.63 | 1.87 | 3.53 | 2.19 | 9.08 |
| Delta Torque (MH-ML), lb.in | | 10.54 | 9.72 | 11.70 | 11.19 | 12.83 |
| Scorch time (ts1), min | | 1.27 | 1.30 | 0.58 | 1.13 | 0.17 |
| Cure time (t90), min | | 7.46 | 6.93 | 5.19 | 8.15 | 1.54 |

Table 6: Rheology testing of cured rubbers of Example 6

ACCELERATOR COMPOSITIONS AND METHODS

This application is a U.S. National Stage filing under 35 U.S.C. § 371 of International Application No. PCT/GB2014/053271, filed Nov. 4, 2014, which in turn claims priority to Great Britain Application No. 1319917.9, filed Nov. 12, 2013 and Great Britain Application No. 1415759.8, filed Sep. 5, 2014.

TECHNICAL FIELD OF THE INVENTION

The present invention relates to accelerator compositions and in particular but not exclusively to accelerator compositions for use in vulcanizing or curing synthetic or natural rubber and polymeric compounds. The present invention also relates to methods of vulcanizing or curing rubber and other polymeric compounds.

BACKGROUND TO THE INVENTION

Curing is a term used in polymer chemistry to define the toughening or hardening of polymeric substance, through cross-linking of polymer chains or otherwise. Curing is generally effected by addition of chemical additives, ultraviolet radiation, electron-beam radiation, heat or other activators. The curing of rubber compounds, whether natural rubber or synthetic rubber, is known as "vulcanization". Hereinafter, the term "rubber" will be used to describe both natural rubber and synthetic rubber compounds and mixtures.

Uncured natural rubber and synthetic rubber compounds such as polychloroprene tend to be sticky and deformable at relatively warm temperatures, while being brittle and rigid at relatively cold temperatures. In the natural state, rubber may be relatively inelastic and may undergo a high degree of inelastic deformation due to its long polymer chains which may move against each other freely. Vulcanization prevents or reduces the relatively free movement of these polymer chains through cross-linking, resulting in more elastic deformation when stress is applied to the cured rubber, and a return to the original shape when the stress is removed. Vulcanized rubber products tend to be less sticky or tacky than equivalent non-vulcanized products, and generally have superior mechanical properties such as durability, hardness, abrasion resistance and the like. A vast number of products containing vulcanized rubber are available including rubber tyres, soles for shoes and boots, hose pipes, rubber belts, sporting equipment, rubber flooring etc. The degree of vulcanization of rubber can be tailored to suit whichever application the resultant rubber is to be applied to, and different physical and mechanical properties can be imparted to rubber through vulcanization through use of different curing and vulcanization additives and activators.

Vulcanization is generally irreversible. The cross-linking of the rubber polymer chains is usually done with sulphur, urethane cross-linkers, metallic oxides, acetoxysilane or peroxide-based systems.

The main polymers subjected to vulcanization are polyisoprene (natural rubber), polychloroprene (CR), styrene-butadiene rubber (SBR) and any other rubber containing a diene in the polymer chain. The curing regime is adjusted for the substrate and the application of the final rubber product. The reactive sites in most rubber compounds are allylic hydrogen atoms and these C—H bonds are adjacent to carbon-carbon double bonds. In sulphur-based vulcanization some of the C—H bonds are replaced by chains of sulphur atoms that link with a reactive site of another polymer chain. These bridges contain between one and eight atoms. The number of sulphur atoms in the crosslink strongly influences the physical properties of the final rubber article. Short crosslinks give the rubber better heat resistance while longer crosslinks give the rubber good dynamic properties but with less heat resistance.

Sulphur itself is relatively slow as a curing agent, even using industry standard high temperature and pressure curing processes, and even using large quantities of sulphur does not generally produce vulcanized rubber having adequate physical properties. In order to speed up vulcanization or curing processes, whether sulphur-based vulcanization, or using any other curing additive or activator, a curing regime is usually effected which may include multiple types of additive and/or activator, and which includes retarding agents that inhibit vulcanization for a predetermined time or until a specific temperature is reached, antidegradants to prevent degradation of the vulcanized product by heat, oxygen, UV and ozone and "accelerators".

Accelerator compounds and compositions are known for use in accelerating polymeric curing and rubber vulcanization. Many different accelerators are known, and their use will depend on the specific rubber compound(s) to be cured and the intended physical properties of the cured rubber. Activator compounds may also be used to activate accelerator compounds or curing per se. Finally in some processes, curing occurs very quickly and it can be desirable to utilise retardants or retarding agents to retard the onset of cure, cure rate or extent of curing or vulcanisation.

The vulcanization of neoprene or polychloroprene rubber (CR) is generally carried out using metal oxides such as MgO and ZnO in the presence of an accelerator. In addition, because of various processing factors, including "scorch" (the premature cross-linking of rubbers due to the influence of heat), the choice of accelerator is governed by different conditions to other diene rubbers. The primary accelerator in use today for accelerating the vulcanization of CR is ethylene thiourea (ETU) which, although being a proven accelerator for polychloroprene, has been classified as reprotoxic and environmentally damaging.

It would therefore be advantageous to provide an accelerator composition which can be used to accelerate the curing or vulcanization of rubber, whether natural or synthetic, which mitigates at least one of the problems of the prior art.

It would also be advantageous to provide an accelerator composition which can replace ethylene thiourea in acceleration of polychloroprene curing and curing of other natural and synthetic rubber compounds and mixtures.

SUMMARY OF THE INVENTION

According to a first aspect of the invention there is provided a composition comprising a mixture of a carbodithioic acid of formula or its internal salt;
and at least one compound independently selected from a natural or synthetic rubber curing or vulcanisation accelerator, a natural or synthetic rubber curing or vulcanisation activator, and a natural or synthetic rubber curing or vulcanisation retarding agent.

wherein R' and R" are independently selected from a $C_2$-$C_{18}$ aliphatic moiety; aromatic moiety; alicyclic moiety; aromatic heterocyclic moiety; and aliphatic heterocyclic moiety or R' and R" may together form part of an aromatic heterocyclic ring moiety or aliphatic heterocyclic ring moiety.

The or each natural or synthetic rubber curing or vulcanisation accelerator may be a sulphur-containing accelerator, or a non-sulphur containing accelerator.

Each natural or synthetic rubber curing or vulcanisation accelerator may be independently selected from a guanidine, an imidazole, a peroxide, a sulphenamide, a thiazole, benzothiazole, a thiourea, a triazine, a thiuram, a xanthate, a dithiophosphate, a dithiocarbamate, a dithiocaprolactam, an amine, a salt of an amine, an amine aldehyde, and amine-activated dithiocarbamate, an alkylphenyl polysulphide and an alkylphenyl disulphide.

Each accelerator may be independently selected from a thiuram, a thiazole, benzothiazole, a dithiocarbamate, a dithiophosphate and a guanidine.

Each activator may be independently selected from a metal oxide, an amine, a salt of an amine, a thioamine, urea, a quaternary ammonium salt, an amino acid, a fatty acid and an amine complex capable of activating the carbodithioic acid on heating.

In some embodiments the or each activator is an amine or salt thereof. The or each amine may comprise a primary, secondary or tertiary alkali amine, or a cyclic amine. Suitable amines include diamines, propylamine, butylamine, hexylamine, hydroxyamines and cysteamine. Suitable amine salts include amine salts of organic acids, such as $C_2$-$C_{30}$-organic acids and may be selected from an acetate, stearate, oxalate, palmate, sulphate, and hydrochloride. Suitable amino acids include arginine.

Each retarding agent may be independently selected from an amine, a salt of an amine, cyclohexylthiophthalimide, phthalic anhydride, benzoic acid and salicylic acid. It will be appreciated that amine or amine salt retarding agents may act as accelerators in some applications of the compositions of the invention depending on the type and material of the rubber to be cured.

Some of the accelerators, activators and retarding agents described and detailed above may provide more than one function, for example some amine salts may act as both an accelerator and activator, or may act as an activator and retarding agent.

The composition may comprise a mixture of a carbodithioic acid of formula or its internal salt;
and an amine compound of formula or salt thereof
wherein R' and R" are independently selected from a $C_2$-$C_{18}$ aliphatic moiety; aromatic moiety; alicyclic moiety; aromatic heterocyclic moiety; and aliphatic heterocyclic moiety or R' and R" may together form part of an aromatic heterocyclic ring moiety or aliphatic heterocyclic ring moiety;

X is selected from a $C_2$-$C_{18}$ straight or branched, unsubstituted or substituted alkyl group; a straight or branched, unsubstituted or substituted $C_2$-$C_{18}$ aminoalkyl group; a disulphide bond; a straight or branched, unsubstituted or substituted $C_2$-$C_{18}$ hydroxyalkyl group, a straight or branched, unsubstituted or substituted $C_2$-$C_{18}$ aminohydroxyalkyl group, and a ring moiety; and Y is selected from $C_2$-$C_{18}$ straight or branched, unsubstituted or substituted alkyl, hydroxyalkyl or aminoalkyl group.

The composition therefore provides a natural or synthetic rubber curing or vulcanisation accelerator composition in which the carbodithioic acid acts as a primary accelerator, and in which a secondary accelerator or activator is present.

In some embodiments R' and R" together form part of an aliphatic heterocyclic ring moiety having 5, 6, 7 or 8 carbon atoms in the ring. The aliphatic heterocyclic ring moiety may be selected from piperazine, hexahydropyrimidine, hexahydropyridazine, imidazolidine, pyrazolidine, or an N-substituted or C-substituted derivative of any of the aforesaid moieties; a $C_6$-$C_{12}$ diazacycloalkane; oxazolidine; or thiazolidine. Suitable $C_6$-$C_{12}$ diazacycloalkanes include 1,4-diazacycloheptane and 1,5-diazacyclooctane.

Suitable $C_2$-$C_{18}$ aliphatic moieties as R' or R" groups include nonyl and isononyl groups. Suitable alicyclic moieties as R' or R" groups include cyclohexyl. Suitable aromatic cyclic moieties as R' or R" groups include benzyl.

Particularly useful as carbodithioic acids or internal salts thereof are those selected from piperazine-1-carbodithioic acid, hexahydropyrimidine-1-carbodithioic acid, hexahydropyridazine-1-carbodithioic acid, imidazoline-N-carbodithioic acid, pyrazolidine-N-carbodithioic acid, 1,4-diazacycloheptane-1-carbodithioic acid, 1,5-diazacyclooctane-1-carbodithioic acid, oxazolidine-N-carbodithioic acid, thiazolidine-N-carbodithioic acid, cyclohexylamine-N-carbodithioic acid, dicyclohexylamine-N-carbodithioic acid, diisononylamine-N-carbodithioic acid and dibenzylamine-N-carbodithioic acid. Particularly useful as the carbodithioic acid is piperazine-1-carbodithioic acid.

In some embodiments X is a $C_2$-$C_{18}$ alkyl group selected from ethyl, propyl, butyl, pentyl, hexyl, heptyl, octyl, nonyl, decyl, undecyl and dodecyl, or a mono-substituted derivative thereof. Suitable amines in which X is a $C_2$-$C_{18}$ alkyl group include 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane and 1,12-diaminododecane. In some embodiments the amine is selected from 1,3-diaminopropane and 1,6-diaminohexane.

In some embodiments the composition comprises a mixture of a carbodithioic acid compound (or internal salt thereof) selected from the group consisting of piperazine-1-carbodithioic acid, hexahydropyrimidine-1-carbodithioic acid, hexahydropyridazine-1-carbodithioic acid, imidazoline-N-carbodithioic acid, pyrazolidine-N-carbodithioic acid, 1,4-diazacycloheptane-1-carbodithioic acid, 1,5-diazacyclooctane-1-carbodithioic acid, oxazolidine-N-carbodithioic acid, thiazolidine-N-carbodithioic acid, cyclohexylamine-N-carbodithioic acid, dicyclohexylamine-N-carbodithioic acid, diisononylamine-N-carbodithioic acid and dibenzylamine-N-carbodithioic acid, and an amine selected from the group consisting of 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane and 1,12-diaminododecane, or a salt thereof (such as an acetate, sulphate, hydrochloride or the like).

In some embodiments the composition comprises a mixture of piperazine-1-carbodithioic acid or its internal salt or an N-substituted derivative thereof, and an amine selected from 1,3-diaminopropane, 1,4-diaminobutane, 1,5-diaminopentane, and 1,6-diaminohexane or a salt thereof.

In some embodiments the composition comprises a mixture of piperazine-1-carbodithioic acid or its internal salt and 1,3-diaminopropane or 1,6-diaminohexane or a salt thereof. This mixture is particularly efficacious as an accelerator in the vulcanization or curing of a wide range of natural or synthetic rubber compounds.

In embodiments of the compositions of the invention the carbodithioic acid may act as a primary (or sole) accelerator, which may be combined with another accelerator as detailed hereinabove.

The carbodithioic acid and amine may be present in a molar ratio of between 1:1 carbodithioic acid to amine and 5:1 carbodithioic acid to amine, such as between 1.5:1 and 3:1 or around 2:1.

The composition may further comprise a carrier liquid. The carrier liquid may be selected from a liquid alkane. The liquid alkane may comprise a liquid $C_5$-$C_{17}$ alkane, such as a liquid $C_5$-$C_8$ alkane. In some embodiments the liquid alkane comprises pentane, hexane, heptane or octane. The liquid alkane may comprise a $C_6$ alkane selected from one or more of n-hexane, 2-methylpentane, 3-methylpentane, 2,3-dimethylbutane and 2,4-dimethylbutane.

The composition may include one or more additional vulcanization or curing accelerator compounds. The or each additional accelerator compound may be selected from ethylene thiourea (ETU) or any other thiourea, a dithiocarbamate, a thiuram, a thiocarbanilide, dithiophosphates, guanidine, xanthogen polysulphides, xanthates, thiazole, benzothiazole, a sulphenamide and a multi-functional additive.

According to a second aspect of the invention there is provided an additive masterbatch comprising the composition of the first aspect of the invention, at least one binder, and at least one plasticiser. The additive masterbatch may further comprise any one or more of a plasticiser, a processing aid, a pH modifier and a colour.

The or each binder may be a polymer binder, which may independently comprise ethylene vinyl acetate (EVA), ethylene propylene diene (EP) styrene-butadiene rubber (SBR), acrylonitrile butadiene (NBR), acrylate rubber (ACM), polybutadiene, ethylene propylene rubber (EPM) and any mixture thereof.

The or each plasticiser may independently comprise any suitable plasticiser such as dioctyl adipate, tributyl citrate, tributyl tartrate or a wax.

The or each processing aid for natural or synthetic latex rubbers may comprise a surfactant, which may be independently selected from an anionic, cationic, zwitterionic and amphoteric surfactant. Suitable surfactants include stearic acid and its salts, such as calcium, sodium or potassium stearate, for example.

The or each pH modifier may comprise an acid or an alkali and may comprise a metal oxide, such as calcium oxide, calcium carbonate ($C_2CO_3$) or sodium carbonate ($Na_2CO_3$) for example.

According to a third aspect of the invention there is provided the use of the composition of the first aspect of the invention as described and defined hereinabove for curing or vulcanizing natural or synthetic rubber or curing synthetic polymer material.

According to a fourth aspect of the invention there is provided the use of a carbodithioic acid compound of formula or its internal salt;
and an amine compound of formula or a salt thereof
for vulcanizing or curing natural or synthetic rubber or curing synthetic polymer material,
wherein R' and R" are independently selected from a $C_2$-$C_{18}$ aliphatic moiety; aromatic moiety; alicyclic moiety; aromatic heterocyclic moiety; and aliphatic heterocyclic moiety or R' and R" may together form part of an aromatic heterocyclic ring moiety or aliphatic heterocyclic ring moiety; and X is selected from a $C_2$-$C_{18}$ straight or branched, unsubstituted or substituted alkyl group; a straight or branched, unsubstituted or substituted $C_2$-$C_{18}$ aminoalkyl group; a disulphide bond; a straight or branched, unsubstituted or substituted $C_2$-$C_{18}$ hydroxyalkyl group, a straight or branched, unsubstituted or substituted $C_2$-$C_{18}$ aminohydroxyalkyl group, and a ring moiety; and Y is selected from a $C_2$-$C_{18}$ straight or branded unsubstituted or substituted alkyl, hydroxyalkyl or aminoalkyl group.

The carbodithioic acid may be as described and defined hereinabove in the first aspect of the invention. In some embodiments the carbodithioic acid is selected from piperazine-1-carbodithioic acid, hexahydropyrimidine-1-carbodithioic acid, hexahydropyridazine-1-carbodithioic acid, imidazoline-N-carbodithioic acid, pyrazolidine-N-carbodithioic acid, 1,4-diazacycloheptane-1-carbodithioic acid, 1,5-diazacyclooctane-1-carbodithioic acid, oxazolidine-N-carbodithioic acid, thiazolidine-N-carbodithioic acid, cyclohexylamine-N-carbodithioic acid, dicyclohexylamine-N-carbodithioic acid, diisononylamine-N-carbodithioic acid and dibenzylamine-N-carbodithioic acid. In an embodiment the fourth aspect of the invention provides the use of piperazine-1-carbodithioic acid for use in curing rubber or synthetic polymer material. The use of a carbodithioic acid or internal salt thereof as an accelerator additive has been found to enable efficient vulcanization and curing of synthetic and natural rubber compounds, whilst being less environmentally damaging or problematical than known accelerators such as ethylene thiourea, for example.

According to a fifth aspect of the invention there is provided a method of manufacturing a composition of the first aspect of the invention comprising suspending a carbodithioic acid compound and the or each accelerator and/or activator in a liquid alkane, adding compound to the suspension followed by mixing, and optionally evaporating the liquid alkane or filtering the solid carbodithioic acid. The carbodithioic acid and each accelerator and/or activator may be as described and defined hereinabove. In some embodiments of the method of the fifth aspect of the invention the carbodithioic acid compound (or internal salt thereof) is selected from the group consisting of piperazine-1-carbodithioic acid, hexahydropyrimidine-1-carbodithioic acid, hexahydropyridazine-1-carbodithioic acid, imidazoline-N-carbodithioic acid, pyrazolidine-N-carbodithioic acid, 1,4-diazacycloheptane-1-carbodithioic acid, 1,5-diazacyclooctane-1-carbodithioic acid, oxazolidine-N-carbodithioic acid, thiazolidine-N-carbodithioic acid, cyclohexylamine-N-carbodithioic acid, dicyclohexylamine-N-carbodithioic acid, diisononylamine-N-carbodithioic acid and dibenzylamine-N-carbodithioic acid, and the activator is selected from the group consisting of 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane and 1,12-diaminododecane.

In some embodiments the carbodithioic acid is suspended in a liquid alkane selected from pentanes, hexanes, heptanes or octanes, and in some embodiments the liquid alkane is a mixture of hexanes. The carbodithioic acid may be added to the liquid alkane (such as a mixture of hexanes), with stirring or agitation, at a temperature of between 20° C.-35° C. The or each accelerator and/or activator may be added to the suspension with stirring or agitation, at a temperature of between 15° C. and 35° C., such as between 18° C. and 27° C., or between 20° C. and 25° C.

The liquid alkane may be removed by evaporation, which may be done via any conventional means, such as by rotary evaporation, or by filtering, for example. The resultant mixture may then be dried, such as by vacuum drying, for example.

According to a sixth aspect of the invention there is provided a method of curing a natural or synthetic rubber compound, the method comprising the steps of:
a) mixing together a natural or synthetic rubber compound with a composition of the first aspect of the invention or a masterbatch of the second aspect of the invention and optionally sulphur; and
b) vulcanizing or curing the natural or synthetic rubber compound In embodiments where the natural or synthetic rubber compound is latex, the mixing in step a) may be performed at a temperature of up to around 45° C., such as between 15° C. and 45° C., or between 20° C. and 35° C.

In other embodiments the mixing in step a) may be performed at a temperature of up to around 80° C., such as between 15° C. and 80° C., or between 15° C. and 70° C.

In embodiments where the natural or synthetic rubber compound is latex, the vulcanization or curing in step b) may be performed at a temperature of up to around 150° C., around 140° C., such as between 50° C. and 140° C., or between 70° C. and 130° C.

In other embodiments the vulcanization or curing in step b) may be performed at a temperature of up to around 300° C., 275° C. or 250° C., such as between 75° C. and 275° C., or between 100° C. and 250° C.

The or each activator may be a metal salt and may be a compound containing a metal selected from zinc, titanium, lead, magnesium, tellerium or calcium, and may be selected from $ZnCl_2$, $TiO_2$, $PbO_2$ $CaO$ $MgO$ and $Pb_3O_4$ or any mixture thereof.

The natural or synthetic rubber compound may be selected from polychloroprene (CR, also known as neoprene), natural rubber, polyisoprene (synthetic or natural), natural rubber latex, synthetic rubber latex, butadiene rubber (BR), styrenebutadiene rubber (SBR), ethylene propylene diene monomer rubber (EPDM), polyisobutylene rubber (PIB), ethylene acrylic rubber (AEM), isobutylene-isoprene rubber (IIR), brominated IIR (BIIR), chlorinated IIR (CIIR), epichlorhydrin (ECO), acrylonitrile butadiene (NBR), or mixtures thereof.

The method may comprise providing in step a) a composition comprising a mixture of a carbodithioic acid of formula or its internal salt;
and an amine compound of formula wherein R' and R" are independently selected from a $C_2$-$C_{18}$ aliphatic moiety; aromatic moiety; alicyclic moiety; aromatic heterocyclic moiety; and aliphatic heterocyclic moiety or R' and R" may together form part of an aromatic heterocyclic ring moiety or aliphatic heterocyclic ring moiety; and X is selected from a $C_2$-$C_{18}$ straight or branched, unsubstituted or substituted alkyl group; a straight or branched, unsubstituted or substituted $C_2$-$C_{18}$ aminoalkyl group; a disulphide bond; a straight or branched, unsubstituted or substituted $C_2$-$C_{18}$ hydroxyalkyl group, a straight or branched, unsubstituted or substituted $C_2$-$C_{18}$ aminohydroxyalkyl group, and a ring moiety; and Y is selected from a $C_2$-$C_{18}$ straight or branched, unsubstituted or substituted alkyl, hydroxyalkyl or aminoalkyl group which composition may be as described and defined hereinabove for the first aspect of the invention and may include any other optional ingredients described and defined therefor.

The method may comprise using one or more curing or vulcanization activators in the composition of the first aspect of the invention during step a), which may be selected from a metal oxide, such as ZnO, MgO, CaO or PbO, for example; or a fatty acid or metal salt thereof such as a $C_{10}$-$C_{24}$ fatty acid or metal salt thereof, and which may be stearic acid, lactic acid or a zinc salt thereof; or an amine.

The composition of the first aspect of the invention or additive masterbatch may be mixed with the natural or synthetic rubber in an amount of between 0.25 and 5 parts per hundred rubber (phr), such as between 0.5 and 3.5 phr.

According to a seventh aspect of the invention there is provided a vulcanized or cured rubber or polymeric material manufactured by the sixth aspect of the invention. The material may comprise a product which may comprise a tyre, sole for footwear, wellington boots, galoshes, a wetsuit, flippers, tubing, a hose, piping, insulating material, a machine part, a belt, a road surface material, a rubber ball, a hinge, or any other suitable product.

DETAILED DESCRIPTION OF THE INVENTION

In order that the invention may be more clearly understood an embodiment/embodiments thereof will now be described, by way of example only with reference to the following Figures, in which.

EXAMPLES

Example 1—Preparation of a Composition Comprising a Mixture of Carbodithioic Acid and an Amine of the Invention A solution of NaOH (128.0 g, 3.20 mol, 1.161 equiv.) in water (250 mL) was added to a solution of piperazine (250.0 g, 2.90 mol, 1.052 equiv.) in $CH_2Cl_2$ (2.5 L). The resulting biphasic system was gently cooled (internal temperature: 5-10° C.) and vigorously stirred with mechanical stirrer and a solution of $CS_2$ (166.5 mL, 210 g, 2.757 mol, 1 equiv. in $CH_2Cl_2$ (300 mL) was added drop-wise in 65-75 min with such a speed that the internal temperature of the reaction mixture was between 10° C. and 15° C. The resulting suspension was stirred for 10-20 min, filtered and washed on the filter with $CH_2Cl_2$ (250 mL). The crude betaine sodium salt was dried in the air at ambient temperature for 24 h. Yield: 778 g (>100%). This salt was dissolved in dist. water (4.0 L) and acidified with 50% aqueous solution of acetic acid until pH 5.5-6.5 while vigorously stirred by mechanical stirrer. The resulting precipitate was filtered and washed on the filter with dist. water (4×2 L) and twice with methanol (1:750 mL; 2:200 mL) to yield the betaine (internal salt) of piperazine-1-carbodithioic acid (hereinafter "PCA").

The PCA (814 g, 5.02 mol) was placed into 6 L flask from rotary evaporator Buchi-200. The flask was equipped with mechanical stirrer and hexanes (2 L) was added. Neat 1,3-diaminopropane (186 g, 2.51 mol) was added to the resulting suspension under vigorous stirring in a thin spout in ~20-30 min with such a speed that internal temperature of the reaction mixture keeps in the range of 20-25° C. The reaction flask containing the suspension of PCA and 1,3-diaminopropane in hexanes was mounted on rotary evaporator and the solvent was evaporated under reduced pressure (200 mbar, bath temperature 40° C.) in ~1.5 h. The resulting free flying powder was placed in vacuum cabinet and dried for additional 30 min at 20-50 mbar until the weight reached the theoretically calculated value (1000±5 g). The resultant composition comprised a mixture of PCA and 1,3-diaminopropane (Yield: 1004 g (quant.)), according to the invention.

In other examples the 1,3-diaminopropane may be replaced with other accelerators or activators as detailed herein.

Example 2—Preparation of a Polymer Masterbatch Containing the Composition Prepared in Example 1

The following ingredients in Table 1 below were mixed on a 2-roll mill and the resultant polymer masterbatch containing 50% active (PCA and 1,3-diaminopropane) was then allowed to cool.

TABLE 1

Polymer masterbatch composition of Example 2 the invention.

| Ingredient | Function | Amount |
|---|---|---|
| Mixture of PCA and 1,3-diaminopropane (prepared as hereinabove) | Accelerator | 120.0 g |
| Ethylene Propylene Diene monomer (Vistalon (RTM) 404, supplied by Du Pont, USA) | Polymer binder | 35.0 g |
| Ethylene vinyl acetate co-polymer | Polymer binder | 35.0 g |
| Dioctyl adipate | Plasticiser | 12.0 g |
| Stearic acid | Processing aid | 12.0 g |
| Calcium Oxide | pH modifier | 26.0 g |
| | | Total: 240.0 g |

Example 3—Use of the Composition of Example 1 in Curing Polychloroprene Rubber Gumstock Polychloroprene rubber gumstock (unfilled) was prepared by mixing and compounding the following ingredients at between 20° C. and 70° C. for 10 to 15 minutes. All amounts are listed as parts per hundred rubber (phr):
Polychloroprene granules—100 phr
Stearic acid—0.6 phr
Accelerator composition of Example 1 2.5 phr The rubber was compounded using a 30 cm 2-roll roller from David Bridge & Co with the nip between the rollers set at $80^{th}$ and the guides set at 15 cm apart.

After compounding the rubber was removed and allowed to cool for 3 hours before testing for rheological properties.

A moving die rheometer (MDR) was used for testing rheological properties. The test was performed at 160° C. for 15 minutes in a Monsanto Rheometer MDR 2000E. Approximately 5 g of each sample material was used for each rheological test and each sample was tested at least 3 hours but less than 24 hours after compounding.

Following the rheological testing, the rubber was cured at 160° C. for 1.5×T90 on a 12 inch diameter hydraulic press from Bradley and Turton Ltd. 100 tonnes was applied to approximately 70 g material within a 15×15×0.2 cm mould.

Figure 1:
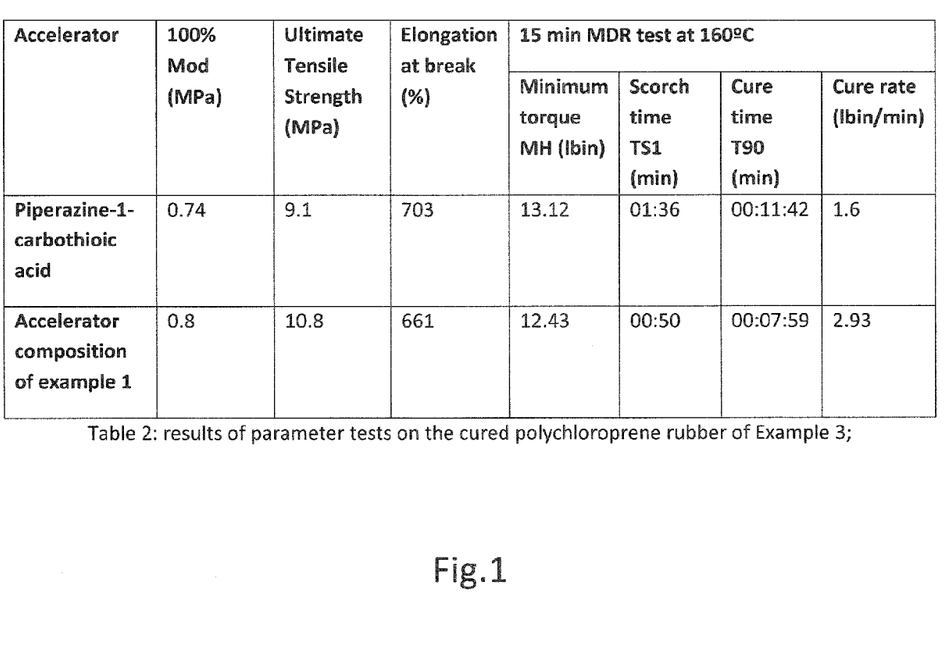
FIG. 1 is a table showing the results of rheometer tests on the cured polychloroprene rubber of Example 3.

The resultant cured rubber sheet was tested for the following parameters—modulus of elasticity, ultimate tensile strength, elongation at break point (all at time 0 and after 7 days incubation at 70° C.) and hardness. The results of the rheology and physical parameter testing are set out in Table 2 of FIG. 1.

Figure 2:
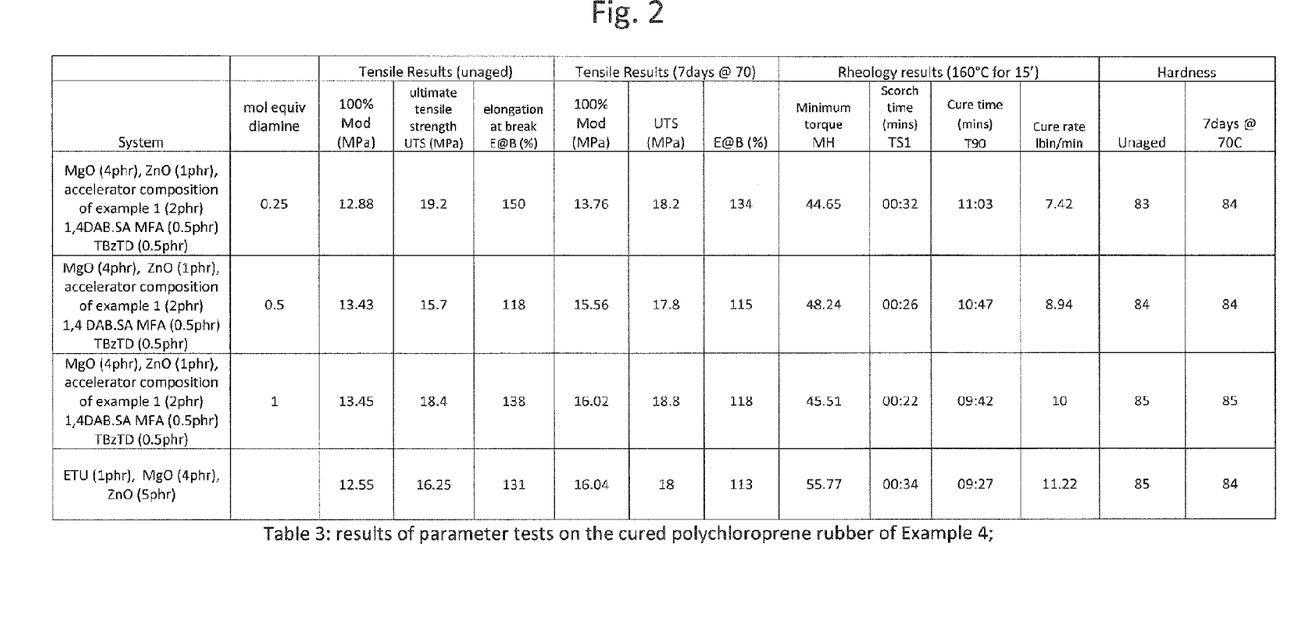
FIG. 2 is a table showing the results of rheometer tests on the cured polychloroprene rubber of Example 4.

Example 4—Use of Accelerator Systems Incorporating the Composition of Example 1 in Curing Polychloroprene Rubber Masterbatch A polychloroprene masterbatch formulation was prepared using the following ingredients which were all mixed between 20° C. and 70° C. from 10 to 15 minutes.
Polychloroprene rubber—100 phr
Carbon black (FEF N550—supplied by Cabot Corporation)—70 phr
Citrofol (a citrade plasticizer supplied by Jungbunzlaver Suisse AG)—10 phr
ODPA (octylated diphenylamine antioxidant supplied by Duslo, Slovak Republic)—2 phr
WS180 (a processing aid supplied by Struktol)—1 phr The resultant polychloroprene masterbatch was then compounded with a number of accelerator systems incorporating the composition of Example 1, which included secondary accelerators such as tetrabenzyldithiuram disulphide (TBzTD) and activators (metal oxides ZnO or MgO, multi-functional additive (1,4DAB.SA (1,4-diaminobutane/stearic acid)) as shown in Table 3 of FIG. 2. A control accelerator system which did not include the composition of Example 1, but instead used a known ethylene thiourea system (ETU) was also used. Compounding of the polychloroprene masterbatch with each accelerator systems was done at between 20° C. and 70° C., and subsequent vulcanization/curing was undertaken using the process described in Example 3.

The rubber was compounded using a 30 cm 2-roll roller from David Bridge & Co with the nip between the rollers set at $80^{th}$ and the guides set at 15 cm apart.

After compounding the rubber was removed and allowed to cool for 3 hours before testing for rheological properties.

A moving die rheometer (MDR) was used for testing rheological properties. The test was performed at 160° C. for 15 minutes in a Monsanto Rheometer MDR 2000E. Approximately 5 g of each sample material was used for each rheological test and each sample was tested at least 3 hours but less than 24 hours after compounding.

Following the rheological testing, the rubber was cured at 160° C. for 1.5×T90 on a 12 inch diameter hydraulic press from Bradley and Turton Ltd. 100 tonnes was applied to approximately 70 g material within a 15×15×0.2 cm mould.

The resultant sheet cured rubber was tested for the following parameters—modulus of elasticity, ultimate tensile strength, elongation at break point (all at time 0 and after 7 days incubation at 70° C.) and hardness. The results of the rheology and physical parameter testing are set out in Table 3 of FIG. 2.

From the results it can be seen that the polychloroprene cured using systems employing the accelerator compositions of Example 1 of the invention, as primary accelerators, match or improve on many of the rheological and physical properties of the rubber, as compared to rubber cured using traditional systems employing ETU. In addition the use of compositions of Example 1, which comprises piperazine-1-carbodithioic acid and 1,3-diaminopropane as an accelerator mixture, is less environmentally harmful than ETU-based systems.

Example 5—Use of Accelerator Systems Incorporating the Composition of Example 1 in Curing Non-Polychloroprene Rubber Compositions Fifteen (15) rubber formulations, each incorporating one of five different non-polychloroprene rubber compounds, were prepared and which incorporated the accelerator composition of Example 1, using a similar process to that described for Example 3.

Figure 3:
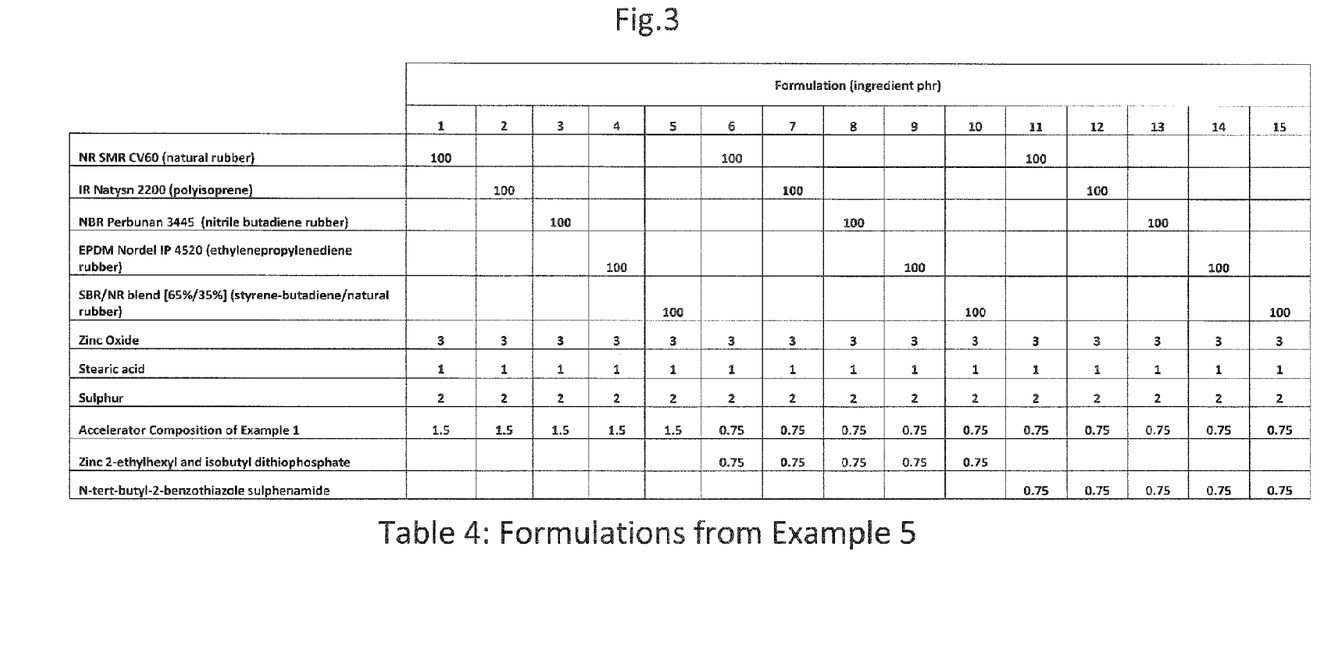
FIG. 3 is a table setting out the formulations of Example 5.

Representative example formulations are set out in Table 4 of FIG. 3. All ingredient concentrations are in phr (parts per hundred rubber)

Each formulation was mixed between the rollers of a 30 cm, 2-roll roller with a nip of $80^{th}$ for all formulations bar those containing EDPM and NBR, where the nip was $20^{th}$. All formulations were processed with the roller guidelines at 15 cm, apart from those containing EDPM and NBR where the guides were opened to the maximum. The formulations were mixed with the rollers set at 63° C. except for those containing NBR which were mixed at ambient temperature. Following curing, the cured rubber formulations were cooled for 3 hours at room temperature prior to testing for rheological and physical properties.

A moving die rheometer (MDR) was used from testing rheological properties. The test was performed at 160° C. for 15 minutes except for Formulations 3, 4 and 5 which extended to 30 minutes in a Monsanto Rheometer MDR 2000E. Approximately 5 g of each sample material was used for each rheological test, and each sample was tested at least 3 hours but less than 24 hours after compounding.

Following the rheological testing the rubber formulation were cured at 160° C. for 1.5×T90 on a 12 inch diameter hydraulic press from Bradley and Turton Ltd. 100 tonnes was applied to approximately 70 g of material within a 15×15×0.2 cm mould.

Figure 4:
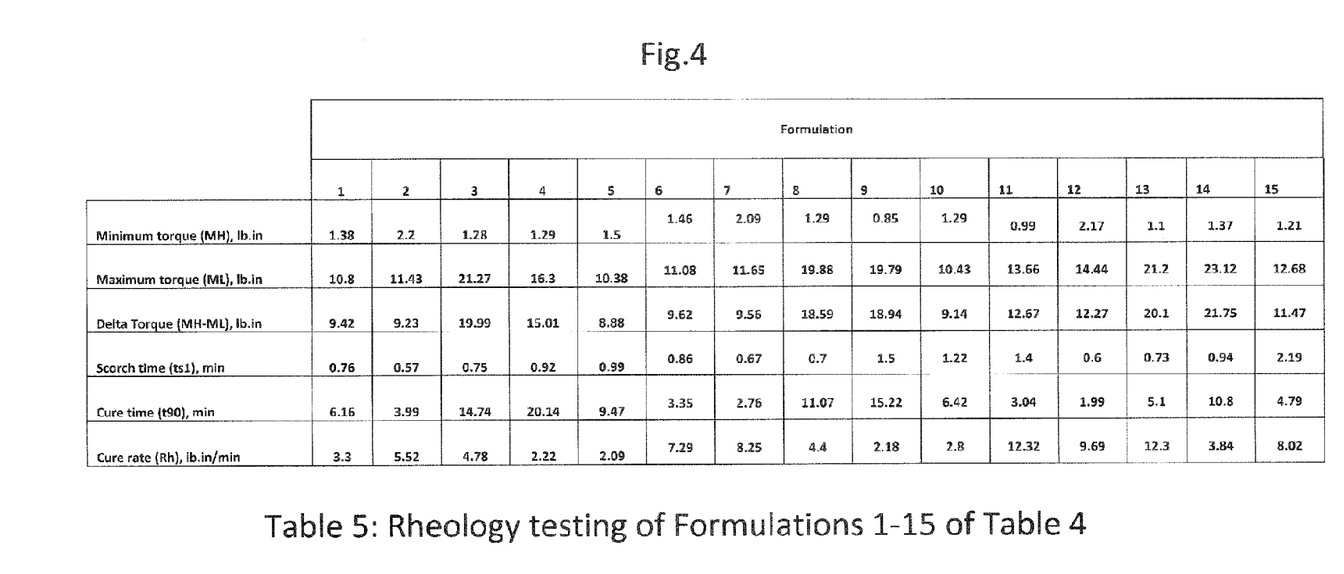
FIG. 4 is a table setting out the rheometer data from testing of the formulations of Example 5.

The results of the rheological testing are given in Table 5 of FIG. 4.

The results of the rheological tests show that diene-based rubbers can be effectively and efficiently cured using the compositions of Example 1, whether alone or in combination with secondary accelerators and activators.

Example 6—Use of Further Accelerator Systems Incorporating Compositions of the Invention in Curing Polychloroprene Rubber Compositions Five further compositions of the invention were prepared comprising the following mixtures:

| Ref | Carbodithioic acid | Accelerator or Activator |
|-----|-------------------|--------------------------|
| 401 | PCA | Butylamine |
| 402 | PCA | Multi-functional additive - the reaction product of butylamine and stearic acid |
| 403 | PCA | Tetramethylthiuram Disulfide (TMTD) |
| 404 | PCA | Diphenylguanidine (DPG) |
| 405 | PCA | Salicylic acid |

A polychloroprene rubber masterbach formulation was prepared according to the method described in Example 4 and the five compositions compounded with the masterbach according to the method described in Example 4, with the concentration of PCA in each resultant mixture being 0.5 phr, and the concentration of the accelerator or activator being 1 phr.

Figure 5:
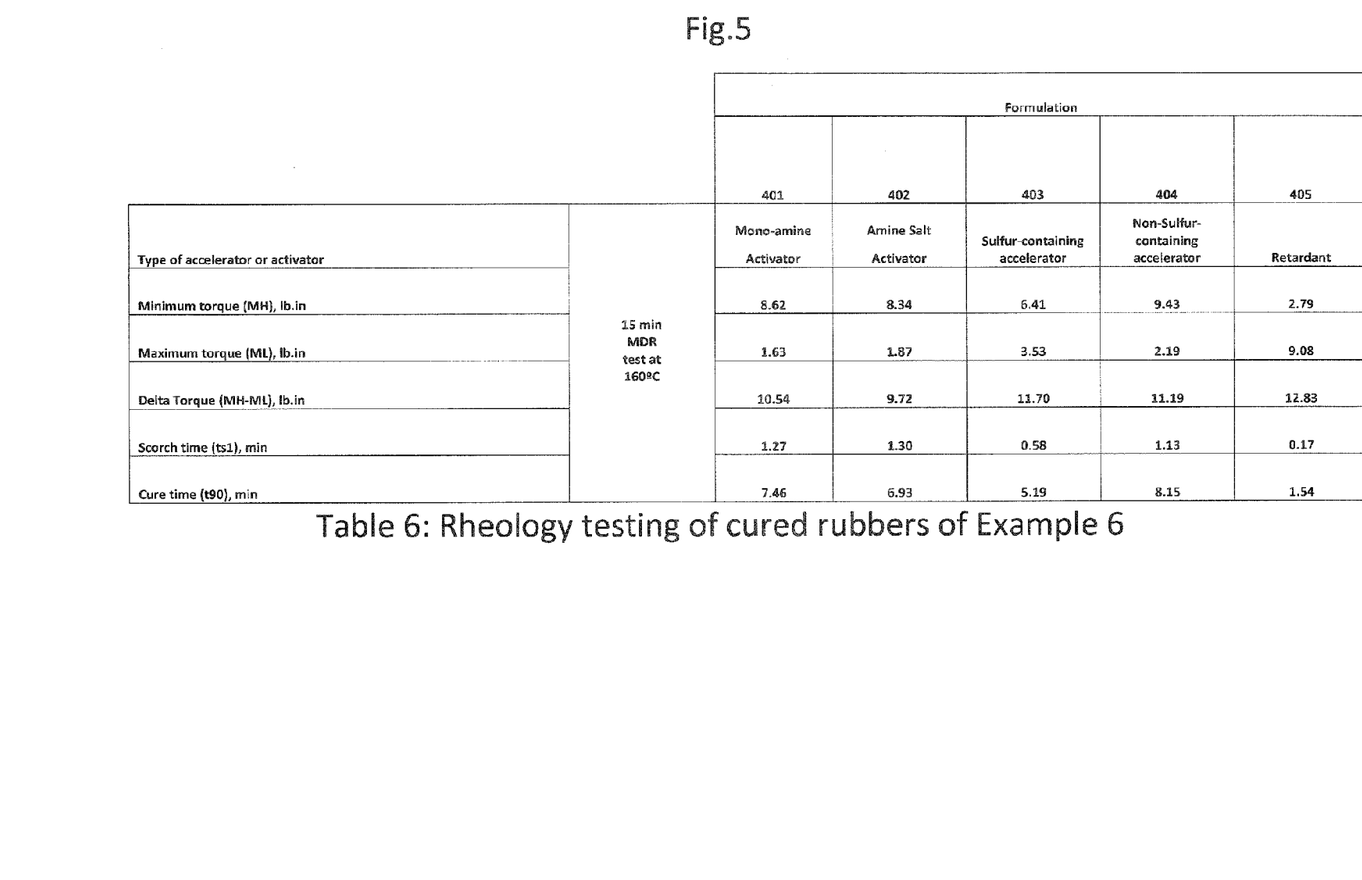
FIG. 5 is a table setting out rheometer data from testing of the formulations of Example 6.

The rheological properties of the resultant rubber, as tested according to the process described in Example 4, and the results, are shown in Table 6 of FIG. 5.

The above embodiments are described by way of example only. Many variations are possible without departing from the scope of the invention as defined in the appended claims.

The invention claimed is:

1. A composition comprising a mixture of a carbodithioic acid of formula or its internal salt;
wherein R' and R" together form a heterocyclic ring structure selected from the group consisting of piperazine, hexahydropyrimidine, hexahydropyridazine, imidazolidine, pyrazolidine, or a N-substituted or C-substituted derivative of any of the aforesaid moieties; a $C_6$-$C_{12}$ diazacycloalkane; oxazolidine; and thiazolidine, and at least one compound independently selected from the group consisting of a natural or synthetic rubber curing or vulcanization accelerator, activator or retarding agent.

2. The composition as claimed in claim 1 wherein each natural or synthetic rubber curing or vulcanisation accelerator is independently selected from the group consisting of a guanidine, an imidazole, a peroxide, a sulphenamide, a thiazole, benzothiazole, a thiourea, a triazine, a thiuram, a xanthate, a dithiophosphate, a dithiocarbamate, a dithiocaprolactam, an amine, a salt of an amine, an amine aldehyde, and amine-activated dithiocarbamate, an alkylphenyl polysulphide and an alkylphenyl disulphade.

3. The composition as claimed in claim 2, wherein each accelerator is independently selected from the group consisting of a thiuram, a thiazole, a benzothiazole, a dithiocarbamate, a dithiophosphate and a guanidine.

4. The composition as claimed in claim 1 wherein each activator is independently selected from the group consisting of a metal oxide, an amine, a salt of an amine, a thioamine, urea, a quaternary ammonium salt, an amine acid, a fatty acid and an amine complex capable of activating the carbodithioic acid on heating.

5. The composition as claimed in claim 1 wherein each activator is an amine or salt thereof.

6. The composition as claimed in claim 1 wherein each retarding agent is selected from the group consisting of an amine, a salt of an amine, cyclohexylthiophthalimide, phthalic anhydride, benzoic acid and salicylic acid.

7. The composition as claimed in claim 1 wherein at least one activator is an amine compound of formula:

H$_2$N—X—NH$_2$ or H$_2$N—Y—OH;

wherein X is selected from a $C_2$-$C_{18}$ straight or branched, unsubstituted or substituted alkyl group; a straight or branched, unsubstituted or substituted $C_2$-$C_{18}$ aminoalkyl group; a disulphide bond; a straight or branched, unsubstituted or substituted $C_2$-$C_{18}$ hydroxyalkyl group, a straight or branched, unsubstituted or substituted $C_2$-$C_{18}$ aminohydroxyalkyl group, a ring moiety; and Y is selected from a $C_2$-$C_{18}$ straight or branched, unsubstituted or substituted alkyl, hydroxyalkyl or aminoalkyl group.

8. The composition as claimed in claim 4 wherein the amine is a $C_2$-$C_{18}$ diaminoalkane.

9. The composition as claimed in claim 8 wherein the diaminoalkane is diaminopropane or diaminohexane.

10. The composition as claimed in claim 8 wherein the diaminoalkane is 1,3-diaminopropane or 1,6-diaminohexane.

11. The composition as claimed in claim 1 wherein the carbodithioic acid is piperazine-1-carbodithioic acid.

12. The composition as claimed in claim 1 further comprising a liquid alkane in which the carbodithioic acid is suspended.

13. An additive masterbatch composition comprising the composition of claim 1, at least one binder, and at least one plasticiser.

14. The additive masterbatch composition as claimed in claim 13 further comprising at least one processing aid and/or at least one pH modifier.

15. A method of curing a natural or synthetic rubber compound, the method comprising the steps of mixing together a natural or synthetic rubber compound with the composition of claim 1 or the masterbatch of claim 13 and vulcanizing or curing the natural or synthetic rubber compound.

16. The method as claimed in claim 15 wherein the natural or synthetic rubber compound is selected from the group consisting of polychloroprene rubber, natural rubber, polyisoprene, nitrile rubber, natural latex, butadiene rubber, styrenebutadiene rubber, ethylene propylene diene monomer rubber, polyisobutylene rubber, ethylene acrylic rubber, isobutylene-isoprene rubber, brominated isobutylene-isoprene rubber, chlorinated isobutylene-isoprene rubber, epichlorhydrin, acrylonitrile butadiene, or mixtures thereof.

17. The method as claimed in claim 16 wherein the mixing step is performed at a temperature of up to 45° C.

18. The method as claimed in claim 16 wherein the curing or vulcanizing step is performed at a temperature of between 15° C. and 350° C.

19. The method as claimed in claim 15, wherein the natural or synthetic rubber compound is natural rubber latex or synthetic rubber latex and the vulcanization or curing step is performed at a temperature of up to 150° C.

20. The method as claimed in claim 15 wherein the natural or synthetic rubber compound is not latex and the vulcanization or curing step is performed at a temperature of up to 275° C.

21. The composition as claimed in claim 1, wherein the composition is in the form of a dispersion.

22. The additive masterbatch composition as claimed in claim 13, wherein the additive masterbatch composition is in the form of a dispersion.

* * * * *